United States Patent
Lan et al.

(10) Patent No.: US 8,108,008 B2
(45) Date of Patent: Jan. 31, 2012

(54) ELECTRONIC APPARATUS AND CONTROLLING COMPONENT AND CONTROLLING METHOD FOR THE ELECTRONIC APPARATUS

(75) Inventors: Shun-Chien Lan, Taipei (TW); Kun-Wei Tsai, Taipei (TW); Jung-Kun Hsieh, Taipei (TW)

(73) Assignee: Cheng Uei Precision Industry Co., Ltd., New Taipei (TW)

( * ) Notice: Subject to any disclaimer, the term of this patent is extended or adjusted under 35 U.S.C. 154(b) by 280 days.

(21) Appl. No.: 12/634,684

(22) Filed: Dec. 9, 2009

(65) Prior Publication Data

US 2011/0136543 A1 Jun. 9, 2011

(51) Int. Cl.
*H04B 1/38* (2006.01)
*G06F 3/041* (2006.01)

(52) U.S. Cl. ........................ 455/566; 455/550.1; 345/173
(58) Field of Classification Search ............... 455/566, 455/556.1, 556.2, 550.1, 575.1; 345/156, 345/173
See application file for complete search history.

(56) References Cited

U.S. PATENT DOCUMENTS

| | | | |
|---|---|---|---|
| 5,422,656 A * | 6/1995 | Allard et al. | 345/173 |
| 7,002,557 B2 * | 2/2006 | Iizuka et al. | 345/173 |
| 7,224,991 B1 * | 5/2007 | Fuoss et al. | 455/466 |
| 7,388,578 B2 * | 6/2008 | Tao | 345/173 |
| 7,612,766 B2 * | 11/2009 | Shintome | 345/173 |
| 7,768,503 B2 * | 8/2010 | Chiu et al. | 345/173 |
| 2009/0128510 A1 * | 5/2009 | Hagiwara | 345/173 |

\* cited by examiner

*Primary Examiner* — Sonny Trinh

(57) ABSTRACT

An electronic apparatus includes a display screen, a physical button, a touch pad separated from the display screen, and a processor. The touch pad is segmented into a first touch area, a second touch area and a third touch area. The processor judges an action of the physical button to select one of functions of the electronic apparatus and controls the display screen to show a selected function, the processor judges a track from the first touch area and through the second touch area and to the third touch area to operate the selected function and controls the display screen to show an operating result. Therefore, the operation method of the physical button and the touch pad is the same as a larger touch screen.

18 Claims, 6 Drawing Sheets

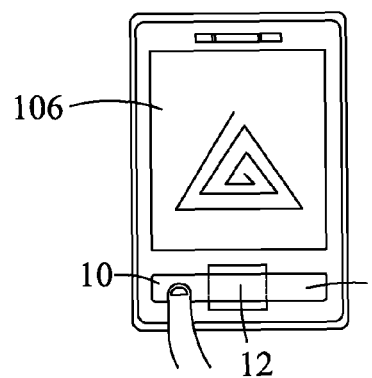 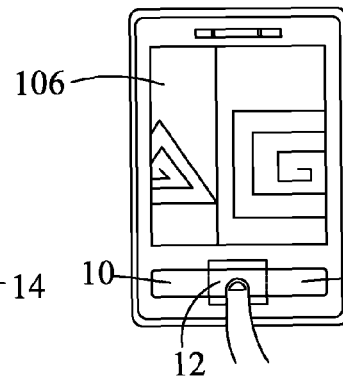 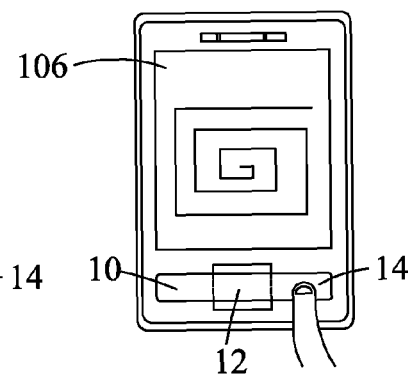
FIG. 5  FIG. 6  FIG. 7
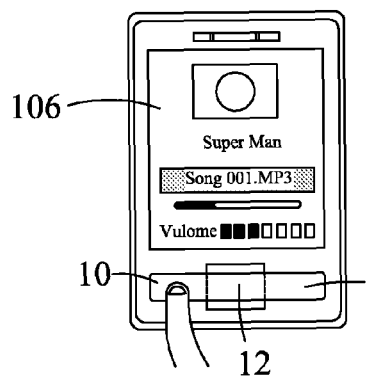 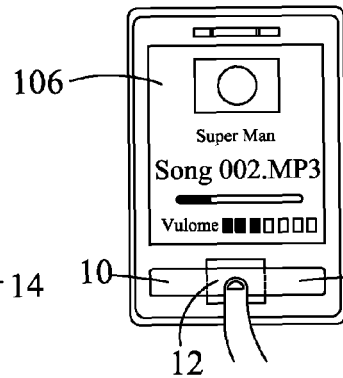 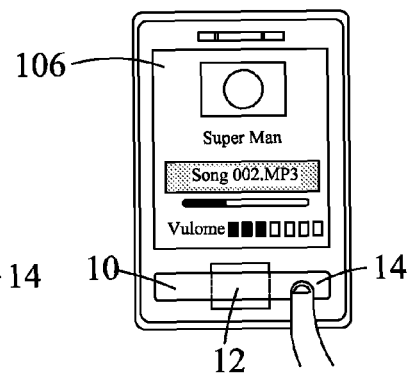
FIG. 8  FIG. 9  FIG. 10

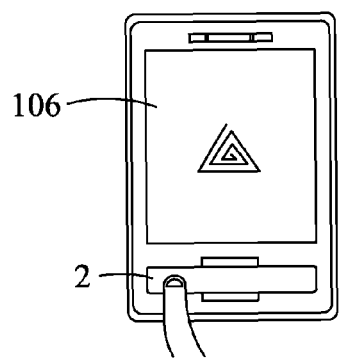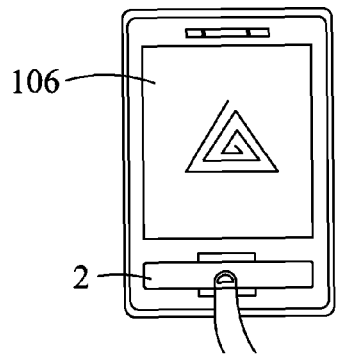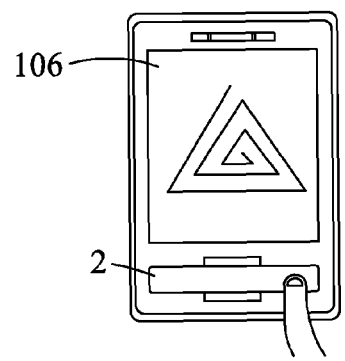
FIG. 23  FIG. 24  FIG. 25
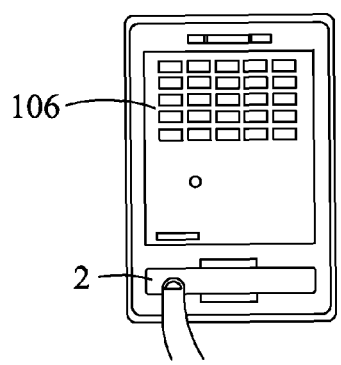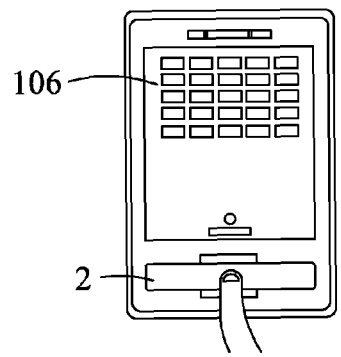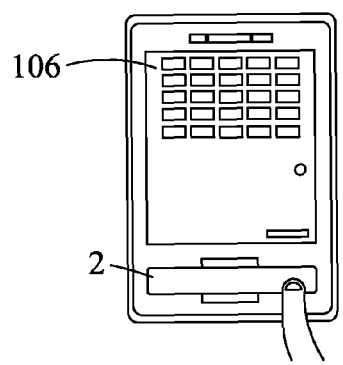
FIG. 26  FIG. 27  FIG. 28

ELECTRONIC APPARATUS AND CONTROLLING COMPONENT AND CONTROLLING METHOD FOR THE ELECTRONIC APPARATUS

BACKGROUND OF THE INVENTION

1. Field of the Invention

The present invention relates to an electronic apparatus, more specifically, to a controlling component capable of controlling the electronic apparatus and a controlling method of the controlling component.

2. The Related Art

Nowadays, many electronic apparatuses equip a touch pad, such as laptops, PDAs, mobile phones. The touch pas is an input component capable of controlling the cursor of the electronic apparatuses by sensing the track of a human finger or the track of a touch pen in order to simulate physical buttons and provide additional functions.

With the progress of the touch pad, a display screen of the electronic apparatus mentioned above becomes a touch screen. The touch screen includes a display screen and a transparent touch pad mounted on the display screen. The operator can control the electronic apparatuses by directly touching the touch screen and gesturing onto the touch screen, such as a sliding action, etc.

The electronic apparatus becomes multifunction. Especially, the electronic apparatus can play video, play music, show pictures, edit pictures, play games, etc. The display screen becomes larger in order to achieve preferred displaying effect. Hence, the touch pad becomes larger for achieving the controlling gestures mentioned above. However, the larger touch pad is more expensive. The cost of the electronic apparatus is increased.

SUMMARY OF THE INVENTION

An object of the present invention is to provide an electronic apparatus with touch operating function as a larger touch screen and a lower cost than that of the larger touch screen.

According to the invention, the electronic apparatus has a housing, a display screen, a touch pad, a physical button and a processor. The housing has a top surface. The physical button, the display screen and the touch pad are positioned on the top surface. The touch pad is separated as the display screen and beside the display screen, and segmented into a first touch area, a second touch area and a third touch area.

The processor is positioned inside the housing and connected to the display screen, the touch pad and the physical button. The processor detects an action of the physical button to select one of functions of the electronic apparatus and makes the display screen show a selected function. The processor judges whether a track from the first touch area and through the second touch area and to the third touch area of the touch pad to operate the selected function and then make the display screen show an operating result.

An object of the present invention is to provide a controlling component with a touch operating function as a larger touch screen and a lower cost than that of the larger touch screen.

According to the invention, the controlling component is arranged to an electronic apparatus having a housing and a display screen positioned on a top surface of the housing. The controlling component includes a physical button, a touch pad and a processor. The physical button is positioned on the top surface. The touch pad is positioned on the top surface, and separated away and located beside the display screen. The touch pad is segmented into a first touch area, a second touch area and a third touch area.

The processor is positioned inside the housing and connected to the display screen, the touch pad and the physical button. The processor detects the action of the physical button to select one of the functions of the electronic apparatus and makes the display screen show the selected function. The processor judges whether the track from the first touch area and through the second touch area and to the third touch area of the touch pad to operate the selected function and then makes the display screen show the operating result.

An object of the present invention is to provide a controlling method capable of simulating an operation of a larger touch screen.

According to the invention, the method includes following steps. The processor inside the electronic apparatus detects the action of the physical button of the electronic apparatus to select one of the functions of the electronic apparatus and then makes the display screen show the selected function.

The processor judges whether the track from the first touch area, through the second touch area and to the third area of the touch pad to operate the selected function and then makes the display screen show the operating result. The track judging method includes following steps.

The processor judges whether a touch is located in the first touch area firstly and then the touch is moved into the second touch area to make the display screen show a crossing effect. Then, the processor will judge whether the touch is moved from the second touch area and then into the third touch area to make the display screen show the operating result.

Hence, the controlling method of the controlling component can simulate the operation method of the larger touch screen. Because the cost of the smaller touch pad is inexpensive and the total cost of the physical button and the touch pad is cheaper than the larger touch screen, the cost of the electronic apparatus can be reduced.

BRIEF DESCRIPTION OF THE DRAWINGS

The present invention will be apparent to those skilled in the art by reading the following description of preferred embodiments thereof, with reference to the attached drawings, in which:

FIG. 5, FIG. 6 and FIG. 7 show the controlling method applying to a picture selecting function of a picture inspecting function according to the present invention;

FIG. 8, FIG. 9 and FIG. 10 show the controlling method applying to a music selecting function of a music inspecting function according to the present invention;

FIG. 23, FIG. 24 and FIG. 25 show the controlling method applying to a picture editing function of the picture inspecting function according to the present invention; and FIG. 26, FIG. 27 and FIG. 28 show the controlling method applying to a game according to the present invention.

DETAILED DESCRIPTION OF THE PREFERRED EMBODIMENT

Figure 1:
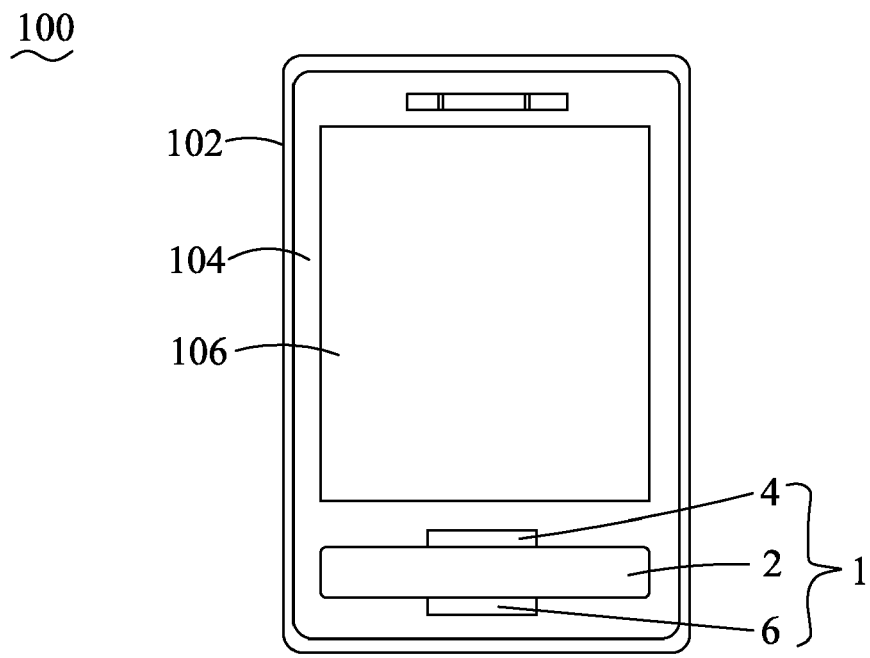
FIG. 1 shows a mobile phone with a controlling component according to the present invention.
Figure 2:
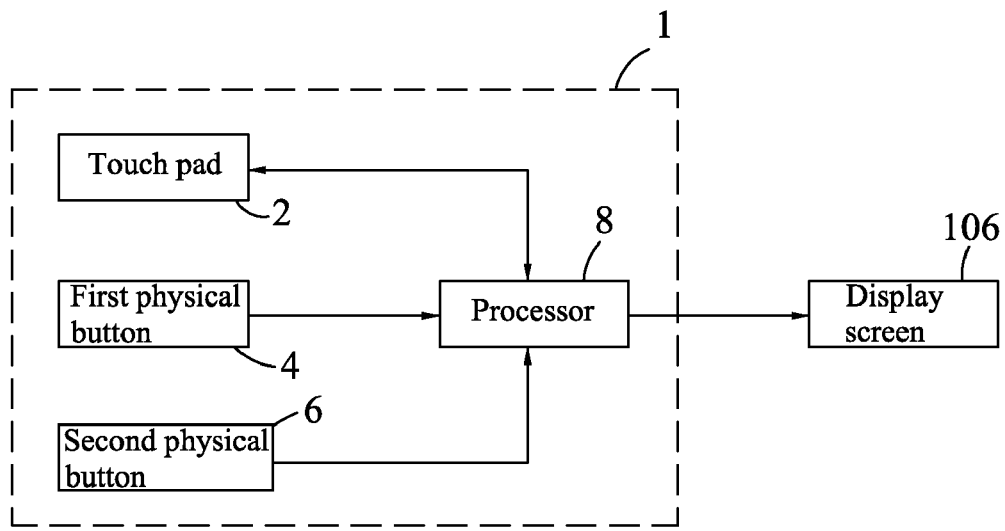
FIG. 2 shows a block diagram of the controlling component according to the present invention.

Please refer to FIG. 1 and FIG. 2. FIG. 1 shows an electronic apparatus 100 with a controlling component 1. FIG. 2 shows a block diagram of the controlling component 1. Especially, the electronic apparatus is a mobile phone 100 having a housing 102, a top surface 104 and a display screen 106 positioned on the top surface 104 of the housing 102. Especially, the display screen 106 is a liquid crystal display.

The controlling component 1 has a touch pad 2, a first physical button 4, a second physical button 6 and a processor 8. The touch pad 2, the first physical button 4 and the second physical button 6 are positioned on the top surface 104 of the housing 102. The processor 8 is positioned inside the housing 102 and connected to the touch pad 2, the first physical button 4, the second physical button 6 and the display screen 106.

Especially, the display screen 106 and the touch pad 2 are of a rectangular shape respectively. Especially, the touch pad 2 is of a bar shape. The area of the touch pad 2 is smaller than the area of the display screen 106. The length of the longer side of the touch pad 2 is approximate to the length of the shorter side of the display screen 106.

The touch pad 2 is positioned beside one of the shorter sides of the display screen 106. The first physical button 4 and the second physical button 6 are oppositely positioned beside the longer sides of the touch pad 2. The first physical button 4 and the second physical button 6 are positioned at a central area of the longer sides of the touch pad 2 respectively. The touch pad 2 is segmented into a first touch area 10, a second touch area 12 and a third touch area 14 from the left to the right (shown in FIG. 5).

Figure 3:
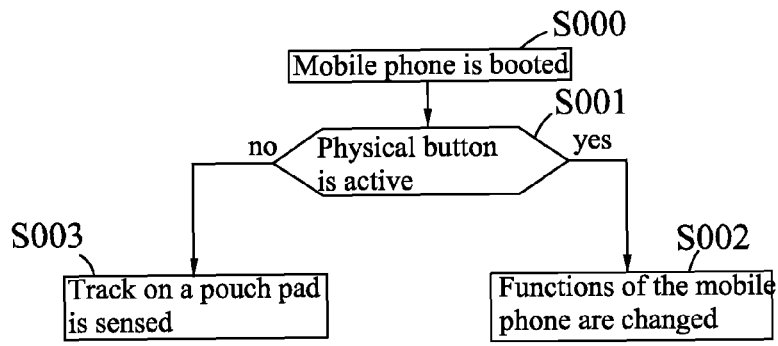
FIG. 3 shows a flow chart of a controlling method according to the present invention.
Figure 4:
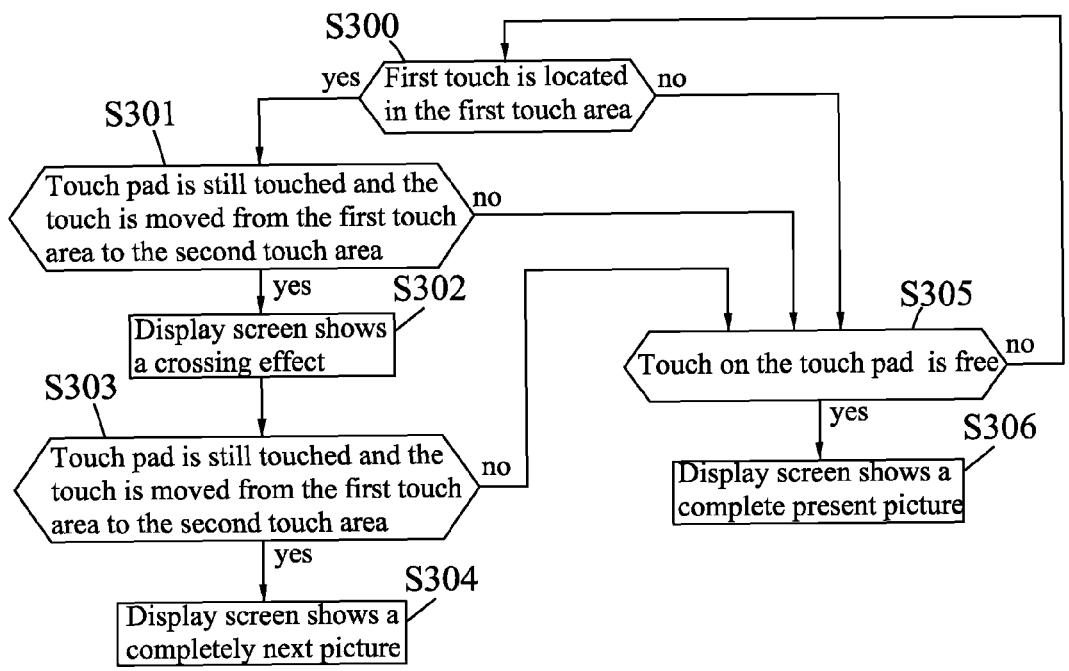
FIG. 4 shows a flow chart of a track sensing method according to the present invention.

Please refer to FIG. 3 to FIG. 7. FIG. 3 shows a flow chart of a controlling method. FIG. 4 shows a flow chart of a track sensing step of the controlling method. FIG. 5 to FIG. 7 show the controlling method applying to a picture inspecting function. The picture inspecting function includes a picture selecting function (shown in FIG. 5 to FIG. 7) and a picture editing function (shown in FIG. 23 to FIG. 25).

If the mobile phone 100 is turned to the picture inspecting function, then the processor 8 makes the mobile phone 100 execute the picture selecting function. The processor 8 judges whether the first physical button 4 or the second physical button 6 is active. If the first physical button 4 or the second physical button 6 is active, the processor 8 will control the mobile phone 100 to turn the picture selecting function to the picture editing function.

The processor 8 judges whether the functions of the mobile phone 100 are turned around continuously from the picture selecting function to the picture editing function. If the functions of the mobile phone 100 are turned around continuously from the picture selecting function to the picture editing function, the processor 8 will turn the picture inspecting function to the picture inspecting function. The controlling method includes following steps.

In step S000, The mobile phone 100 is booted. In step S001, The processor 8 judges whether the first physical button 4 or the second physical button 6 is active. If the first physical button 4 or the second physical button 6 is active, it means that an operator presses the first physical button 4 or the second physical button 6, then the processor 8 will execute step S002, else the processor 8 will execute step S003.

In step S002, the processor 8 turns functions of the mobile phone 100. In other words, if the operator presses one of the first physical button 4 and the second physical button 6, then the processor 8 can turn an idle function to a text imputing function, or turn the text imputing function to a picture inspecting function, or turn the picture inspecting function to a camera inspecting function, or turn the camera inspecting function to a game function, or turn the game function to a music inspecting function.

In step S003, the processor 8 judge the track of a finger of the operator. In other words, if the finger of the operator touches the touch pad 2 and moves onto the touch pad 2, the processor 8 will execute a track sensing function for judging the track and then controlling the mobile phone 100 according to the track. The track sensing of the controlling method includes following steps.

In step S300, the processor 8 judges whether the first touch is located in the first touch area 10. If the first touch is located in the first touch area 10, then the processor 8 will execute step S301, else the processor 8 will execute step S305. In other words, if the finger of the operator firstly touches the first touch area 10, then the processor 8 will execute step S301. If the finger of the operator firstly touches the second touch area 12, the then the processor 8 will execute step S305.

In step S301, the processor 8 judges whether the touch pad 2 is still touched and the touch is moved from the first touch area 10 to the second touch area 12. If the touch pad 2 is still touched and the touch is moved from the first touch area 10 to the second touch area 12, then the processor 8 will execute step S302, else the processor will execute step S305.

In other words, if the finger of the operator touches the touch pad 2 sustained and the finger of the operator moves from the first touch area 10 to the second touch area 12, then the processor 8 will execute step S302. If the finger of the operator moves away from the touch pad 2 or the finger of the operator still in the first touch area 10, then the processor 8 will execute step S305.

In step S302, the processor 8 controls the display screen 106 to show a crossing effect. Especially, if the mobile phone 100 is turned to the picture selecting function, and the finger of the operator touches the touch pad 2 sustained and the finger of the operator moves from the first touch area 10 to the second touch area 12, then the processor 8 will control the display screen 106 to display a left portion of a first picture and a right portion of a second picture for showing the crossing effect (shown in FIG. 6).

In step S303, the processor 8 judges whether the touch pad 2 is still touched and the touch is moved from the second touch area 12 to the third touch area 14. If the touch pad 2 is still touched and the touch is moved from the second touch area 12 to the third touch area 14, then the processor 8 will execute step S304, else the processor will execute step S305.

In other words, if the finger of the operator touches the touch pad 2 sustained and the finger of the operator moves from the second touch area 12 to the third touch area 14, then the processor 8 will execute step S304. If the finger of the operator moves away from the touch pad 2 or the finger of the operator still in the second touch area 12, then the processor 8 will execute step S305.

In step S304, the processor 8 controls the display screen 106 to show a completely next picture. Especially, if the finger of the operator touches the touch pad 2 sustained and the finger of the operator moves from the second touch area 12 to the third touch area 14, the processor 8 will control the display screen 106 to display the completely second picture (shown in FIG. 7).

In step S305, the processor 8 judges whether the touch of the touch pad 2 is free. If the touch of the touch pad 2 is free, then the processor 8 will execute step S306, else the processor 8 repeats step S300. In other words, if the finger of the operator moves away from the pad 2, then the processor 8 will execute step S306. If the finger of the operator touches the touch pad 2 sustained touches the touch pad 2 and the finger of the operator is still touch the present touch area, then the processor 8 will repeat step S300.

In step S306, the processor 8 controls the display screen 106 to show a complete present picture. Especially, if the finger of the operator moves away from the pad 2, the processor 8 will control the display screen 106 to display the completely first picture (shown in FIG. 5). Furthermore, if the finger of the operator touch the third touch area 14, and then the finger of the operator moves from the third touch area 14, through the second touch area 12 and to the first touch area 10, then the processor 8 will control the display screen 106 to show the crossing effect and then show a completely previous picture.

Please refer to FIG. 8 to FIG. 10, which show the controlling method applying to a music inspecting function. The music inspecting function includes a music selecting function (shown in FIG. 8 to FIG. 10), a volume adjusting function (shown in FIG. 17 to FIG. 19) and a speed adjusting function (shown in FIG. 20 to FIG. 22).

If the mobile phone 100 is turned to the music inspecting function, the processor 8 will control the mobile phone 100 to execute the music selecting function. The processor 8 judges whether the first physical button 4 or the second physical button 6 is active. If the first physical button 4 or the second physical button 6 is active, the processor 8 will control the mobile phone 100 to turn music selecting function to the volume adjusting function or turn the volume adjusting function to the speed adjusting function.

The processor 8 judges whether the mobile phone 100 turns around from the music selecting function to the speed adjusting function. If the mobile phone 100 is turned around from the music selecting function to the speed adjusting function, the processor 8 will turn the music inspecting function to the picture inspecting function.

If the mobile phone 100 is in the music selecting function and the finger of the operator touch the first touch area 10 of the touch pad 2 firstly, and then the finger of the operator moves from the first touch area 10, through the second touch area 12 and to the third touch area 14, then the processor 8 will control the display screen 106 to display the crossing effect, such as showing and zoom in the name of a next music, and then display the information of a next music such as music player, music name, time of the music, etc.

Figures 11, 12, 13:
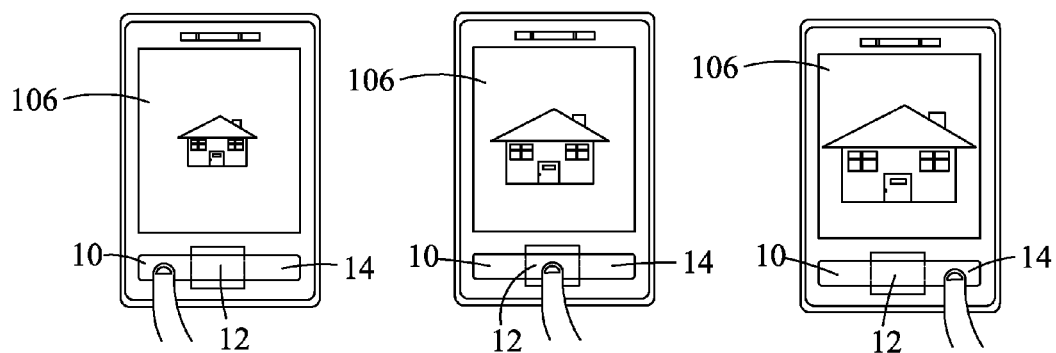
FIG. 11, FIG. 12 and FIG. 13 show the controlling method applying to a camera function according to the present invention.

Please refer to FIG. 11 to FIG. 13, which show the controlling method applying to a camera function. If the mobile phone 100 is turned to the camera function, and the finger of the operator touch the first touch area 10 of the touch pad 2 firstly, and then the finger of the operator moves from the first touch area 10, through the second touch area 12 and to the third touch area 14, then the processor 8 will control the display screen 106 to show a zoom in view.

If the finger of the operator touch the third touch area 14 of the touch pad 2 firstly, and then the finger of the operator moves from the third touch area 14, through the second touch area 12 and to the first touch area 10, then the processor 8 will control the display screen 106 to show a zoom out view.

Figures 14, 15, 16:
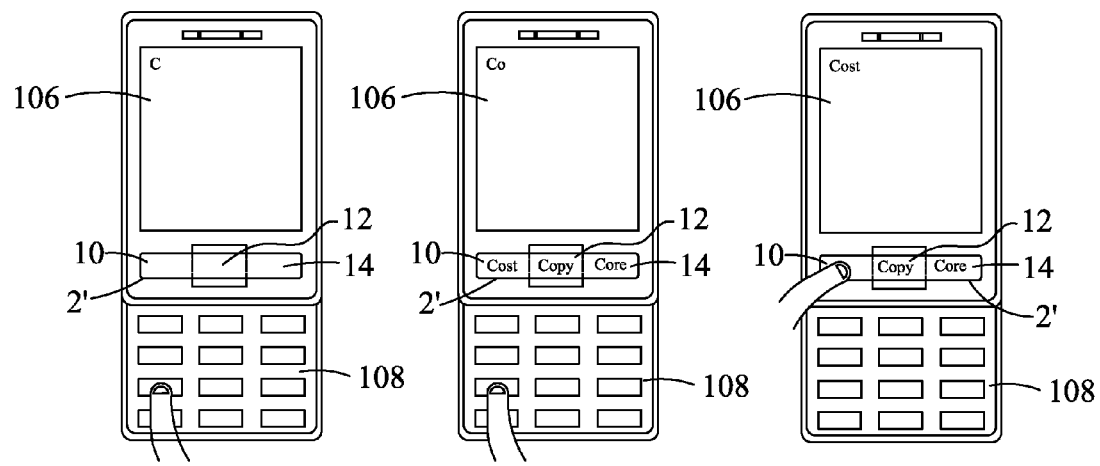
FIG. 14, FIG. 15 and FIG. 16 show the controlling method applying to a text inputting function according to the present invention.

Please refer to FIG. 14 to FIG. 16, which show the controlling method applying to a text inputting function. The mobile phone 100 further includes a key board module 108. The touch pad 2 is a touch screen 2'. If the operator is pressing the key board module 108 to spell a word, then the processor 8 can choose least one predetermined word matching with the spelling and then show the predetermined word by the touch screen 2'.

In this case, if the operator is pressing the key board module 108 to spell "c" and "o", then the processor 8 can choose predetermined words including "cost", "copy" and "core" which match with the spelling. Then the processor 8 will control the touch screen 2' to show the predetermined words of "cost", "copy" and "core" on the first touch area 10, the second touch area 12 and the third touch area 14 respectively.

Hence, the operator can select one of the predetermined words by touch one of first touch area 10, the second touch area 12 and the third touch area 14 responding to the selected predetermined word. In other words, the processor 8 can judge whether one of the first touch area 10, the second touch area 12 and the third touch area 14 is active, and then controls the display screen 106 to show the selected predetermined word.

Figure 17:
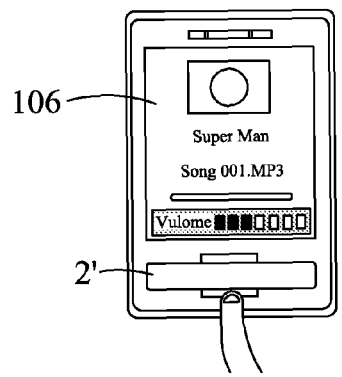
FIG. 17, FIG. 18 and FIG. 19 show the controlling method applying to a volume adjusting function of the music inspecting function according to the present invention.
Figure 18:
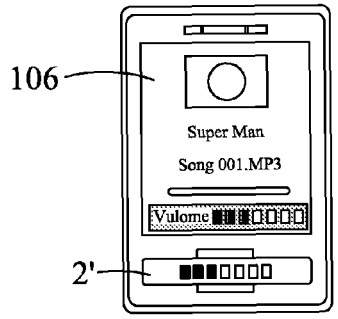
Figure 19:
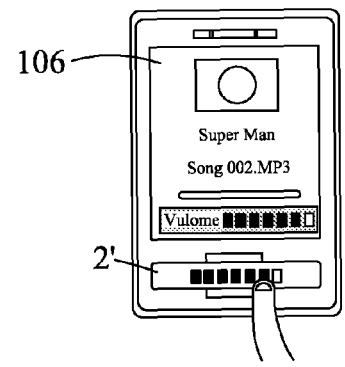

Please refer to FIG. 17 to FIG. 19, which show the controlling method applying to the volume adjusting function of the music inspecting function. The touch screen 2' is not limited to segment into three segments, and the touch screen 2' is further segmented into N segments. Especially, the touch screen 2' is segmented into seven touch areas in the volume adjusting function.

If the electronic apparatus 100 is in the volume adjusting function, the touch screen 2' will show the volume intensity. Especially, the volume intensity is segmented into seven levels. Each level of the volume intensity is shown in each touch area of the touch screen 2' uniquely. The processor 8 judges which touch area are touched and then will change the volume intensity to match with the touched touch area.

Figure 20:
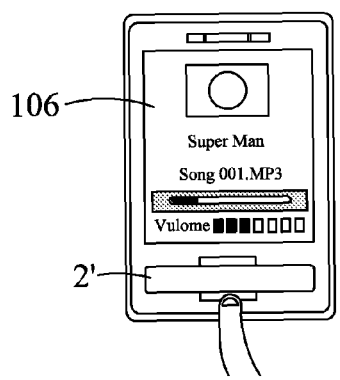
FIG. 20, FIG. 21 and FIG. 22 show the controlling method applying to a speed adjusting function of the music inspecting function according to the present invention.
Figure 21:
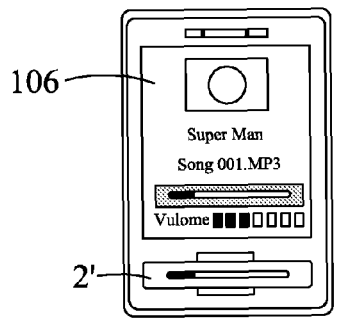
Figure 22:
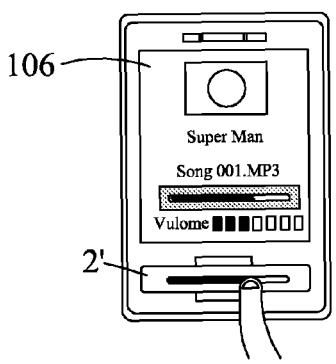

Please refer to FIG. 20 to FIG. 22, which show the controlling method applying to the speed adjusting function of the music inspecting function. The touch screen 2' is segmented into N segments in the speed adjusting function for improved precision of the tracking sensing of the controlling method. And, the processor 8 can execute track sensing of the controlling method cyclically, and then control the mobile phone 100 to change playing speed and control the display screen 106 to show the changed playing speed.

In other words, if the finger of the operator touches the first touch area of the touch screen 2' and then moves from the first touch area to the N touch area sustained, then the playing speed will be kept speeding up and the changed speed will be shown on the display screen sustained.

Please refer to FIG. 23 to FIG. 25, which show the controlling method applying to the picture editing function of the picture inspecting function. If the mobile phone 100 is turned to picture editing function, the executing process of the processor 8 will be the same with the camera function.

Please refer to FIG. 26 to FIG. 28, which show the controlling method applying to the game function. If the mobile phone 100 is turned to the game function, the operator can control the movement of a predetermined object in the game. If the finger of the operator touches the first touch area of the touch screen 2' and then moves from the first touch area to the N touch area sustained, then the predetermined object in the game will be moved towards right sustained and the moved position will be shown on the display screen sustained.

Moreover, if the finger of the operator touches the first touch area of the touch screen 2' and then moves from the N touch area to the first touch area sustained, then the predetermined object in the game will be moved towards left sustained and the moved position is shown on the display screen sustained.

As described above, the functions of the mobile phone 100 can be selected via pressing the first physical button 4 and the second physical button 6 of the controlling component 1. The functions of the mobile phone 100 can be edited by via touch pad 2 or touch screen 2' of controlling component 2. The processor 8 can judge the action of the first physical button 4, the second physical button 6, the touch pad 2 and the touch screen 2' to control the display screen 106 and the touch screen 2' to show the result of the action.

Hence, operation method of the first physical button 4, the second physical button 6, and the touch pad 2 can simulate operation method of the larger touch pad. Because the cost of the smaller touch pad 2 is inexpensive and the total cost of the first physical button 4 and the second physical button 6, and the touch pad 2 is cheaper than the larger touch screen, the cost of the mobile phone 100 can be reduced.

Furthermore, the present invention is not limited to the embodiments described above; diverse additions, alterations and the like may be made within the scope of the present invention by a person skilled in the art. For example, respective embodiments may be appropriately combined.

What is claimed is:

1. An electronic apparatus, comprising:
    a housing having a top surface;
    a display screen positioned on the top surface;
    a touch pad positioned on the top surface, the touch pad being separated from the housing and positioned beside the display screen, the touch pad segmented into a first touch area, a second touch area and a third touch area;
    a first physical button position on the top surface;
    a processor positioned inside the housing and connected to the display screen, the touch pad and the first physical button, the processor judging an action of the first physical button to select one of functions of the electronic apparatus and controlling the display screen to show a selected function, the processor judging a predetermined track from the first touch area and through the second touch area and to the third touch area of the touch pad to operate the selected function and controlling the display screen to show an operating result.

2. The electronic apparatus as claimed in claim 1, further comprising a second physical button position on the top surface of the housing.

3. The electronic apparatus as claimed in claim 2, wherein the display screen is of a rectangular shape, the touch pad is of a bar shape, the touch pad is smaller than the display screen, one of the longer sides of the touch pad and one of the shorter sides of the touch screen is arranged to side by side.

4. The electronic apparatus as claimed in claim 3, wherein the length of the longer side of the touch pad and the length of the shorter side of the touch screen are the same.

5. The electronic apparatus as claimed in claim 4, wherein the first physical button and the second physical button are positioned beside longer sides of the touch pad respectively, the first physical button is positioned between the display screen and the touch pad.

6. The electronic apparatus as claimed in claim 5, wherein the first physical button and the second physical button are positioned beside central areas of the longer sides of the touch pad respectively.

7. The electronic apparatus as claimed in claim 6, wherein touch pad is a touch screen.

8. The electronic apparatus as claimed in claim 7, wherein the electronic apparatus is a mobile phone.

9. A controlling component arranged to an electronic apparatus having a housing and a display screen positioned on a top surface of the housing, comprising:
    a first physical button positioned on the top surface;
    a touch pad positioned on the top surface, the touch pad separated from and beside the display screen, the touch pad segmented into a first touch area, a second touch area and a third touch area;
    a processor positioned inside the housing and connected to the display screen, the touch pad and the first physical button, the processor judging an action of the first physical button to select one of functions of the electronic apparatus and controlling the display screen to show a selected function, the processor judging a predetermined track from the first touch area and through the second touch area and to the third touch area of the touch pad to operate the selected function and controlling the display screen to show an operating result.

10. The electronic apparatus as claimed in claim 9, further comprising a second physical button position on the top surface of the housing.

11. The electronic apparatus as claimed in claim 10, wherein the display screen is of a rectangular shape, the touch pad is of a bar shape, the touch pad is smaller than the display screen, one of the longer sides of the touch pad and one of the shorter sides of the touch screen is arranged to side by side.

12. The electronic apparatus as claimed in claim 11, wherein the length of the longer side of the touch pad and the length of the shorter side of the touch screen are the same.

13. The electronic apparatus as claimed in claim 12, wherein the first physical button and the second physical button are positioned beside longer sides of the touch pad respectively, the first physical button is positioned between the display screen and the touch pad.

14. The electronic apparatus as claimed in claim 13, wherein the first physical button and the second physical button are positioned beside central areas of the longer sides of the touch pad respectively.

15. The electronic apparatus as claimed in claim 14, wherein touch pad is a touch screen, the electronic apparatus is a mobile phone.

16. A method for controlling an electronic apparatus, comprising:
    judging an action of a physical button of the electronic apparatus to select one of functions of the electronic apparatus and controlling a display screen to show a selected function by a processor inside the electronic apparatus;
    judging an a track from a first touch area, through a second touch area and to a third area of a touch pad to operate the selected function and controlling the display screen to show an operating result by the processor,
    wherein the processor judges that a touch is located in the first touch area firstly and then the touch is moved into the second touch area to control the display screen to show a crossing effect, and then the processor judges that the touch is moved from the second touch area and then into the third touch area to control the display screen to show the operating result.

17. The method for controlling an electronic apparatus as claimed in claim 16, wherein the processor judges that the touch is moved from the second touch area and then into the third touch area to control the display screen to show an previous view.

18. The method for controlling an electronic apparatus as claimed in claim 17, wherein the processor judges that the touch is moved from the first touch area and into the second touch area and the touch is free to control the display screen to show the previous view.

* * * * *